(12) United States Patent
Arora et al.

(10) Patent No.: US 9,053,325 B2
(45) Date of Patent: Jun. 9, 2015

(54) DECRYPTION KEY MANAGEMENT SYSTEM

(71) Applicants: Mohit Arora, Faridabad (IN); Rakesh Pandey, Ghaziabad (IN)

(72) Inventors: Mohit Arora, Faridabad (IN); Rakesh Pandey, Ghaziabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 41 days.

(21) Appl. No.: 13/972,933

(22) Filed: Aug. 22, 2013

(65) Prior Publication Data

US 2015/0058612 A1     Feb. 26, 2015

(51) Int. Cl.
*G06F 9/00*  (2006.01)
*G06F 15/177*  (2006.01)
*G06F 21/57*  (2013.01)
*H04L 9/08*  (2006.01)

(52) U.S. Cl.
CPC ............... *G06F 21/575* (2013.01); *H04L 9/08* (2013.01)

(58) Field of Classification Search
CPC .................... G06F 21/575; H04L 9/08
USPC ............ 713/1, 2, 189, 193–194, 190; 380/45, 380/281, 284
See application file for complete search history.

(56) References Cited

U.S. PATENT DOCUMENTS

| | | | |
|---|---|---|---|
| 3,793,631 A * | 2/1974 | Silverstein et al. | 712/233 |
| 5,687,237 A | 11/1997 | Naclerio | |
| 6,128,391 A | 10/2000 | Denno et al. | |
| 6,981,153 B1 | 12/2005 | Pang et al. | |
| 6,996,547 B1 | 2/2006 | Tugenberg et al. | |
| 7,103,782 B1 | 9/2006 | Tugenberg et al. | |
| 7,380,140 B1 * | 5/2008 | Weissman et al. | 713/193 |
| 8,175,276 B2 | 5/2012 | Tkacik et al. | |
| 8,645,716 B1 * | 2/2014 | Dujari et al. | 713/193 |
| 2006/0026417 A1 | 2/2006 | Furusawa et al. | |
| 2006/0227756 A1 * | 10/2006 | Rustagi et al. | 370/342 |
| 2009/0060197 A1 | 3/2009 | Taylor et al. | |
| 2009/0262940 A1 * | 10/2009 | Lim | 380/277 |
| 2011/0138192 A1 * | 6/2011 | Kocher et al. | 713/189 |
| 2012/0201379 A1 | 8/2012 | Fuchs et al. | |
| 2012/0221833 A1 * | 8/2012 | Allaire et al. | 712/37 |

\* cited by examiner

*Primary Examiner* — Fatoumata Traore
*Assistant Examiner* — Amie Lin
(74) *Attorney, Agent, or Firm* — Charles Bergere

(57) ABSTRACT

A decryption key management system includes a memory, a memory controller, a decryption engine, and an on-chip crypto-accelerator. A key blob and an encrypted code are stored in the memory. The memory controller fetches the key blob and stores it in a memory buffer. The decryption engine fetches the key blob and decrypts it using an OTP key to generate a decryption key. The decryption key is used to decrypt the encrypted code and generate a decrypted code.

15 Claims, 3 Drawing Sheets

DECRYPTION KEY MANAGEMENT SYSTEM

BACKGROUND OF THE INVENTION

The present invention relates generally to secure boot of electronic devices and, more particularly, to a system for decryption key management and secure boot of an electronic device.

Modern cryptographic systems use cryptographic keys for converting or encrypt sensitive data into a form that is incomprehensible to unintended recipients. Intended recipients of the encrypted data are provided with cryptographic keys that enable them to decrypt or otherwise transform the encrypted data back to its original form. Thus, transmission of encrypted data mandates an exchange of keys between a sender and a receiver to enable successful encryption and decryption of the data.

In addition to the extensive use of cryptography in transmitting sensitive data, cryptography may also be used to encrypt and store sensitive data. For example, boot codes used for booting-up computer systems and electronic devices often are targets of unauthorized access and tampering. A compromised boot code can provide easy access to data stored in the computer system/electronic device. In a secure system, the boot code is therefore encrypted to prevent unauthorized access and tampering. In addition to using key based cryptography for protecting the authenticity of the boot code, a cryptographic hash function may also be used to verify the authenticity of the boot code. A cryptographic hash function selects an arbitrary block of data and returns a fixed-size bit string known as a hash value. A change in the data, whether accidental or intentional, leads to an altered hash value.

Although the above-mentioned methods enable authenticity, protection and verification of boot codes, they have several disadvantages. Cryptographic hash functions can only be used to verify the authenticity of the boot code but cannot be used to protect the data from unauthorized access. Decrypting the encrypted boot code extends the system boot time. Further, key based encryption of the boot sequence requires exchange of cryptographic keys. Thus, an effective key management system is required to prevent unauthorized access to the encryption/decryption keys and to the boot sequence in such cryptographic systems.

It would be advantageous to have a decryption key management system that prevents unauthorized access to the decryption keys and the boot codes, that is robust enough to withstand hacking attempts, that preserves the authenticity of the boot code, and that overcomes the above-mentioned limitations of conventional decryption key management systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
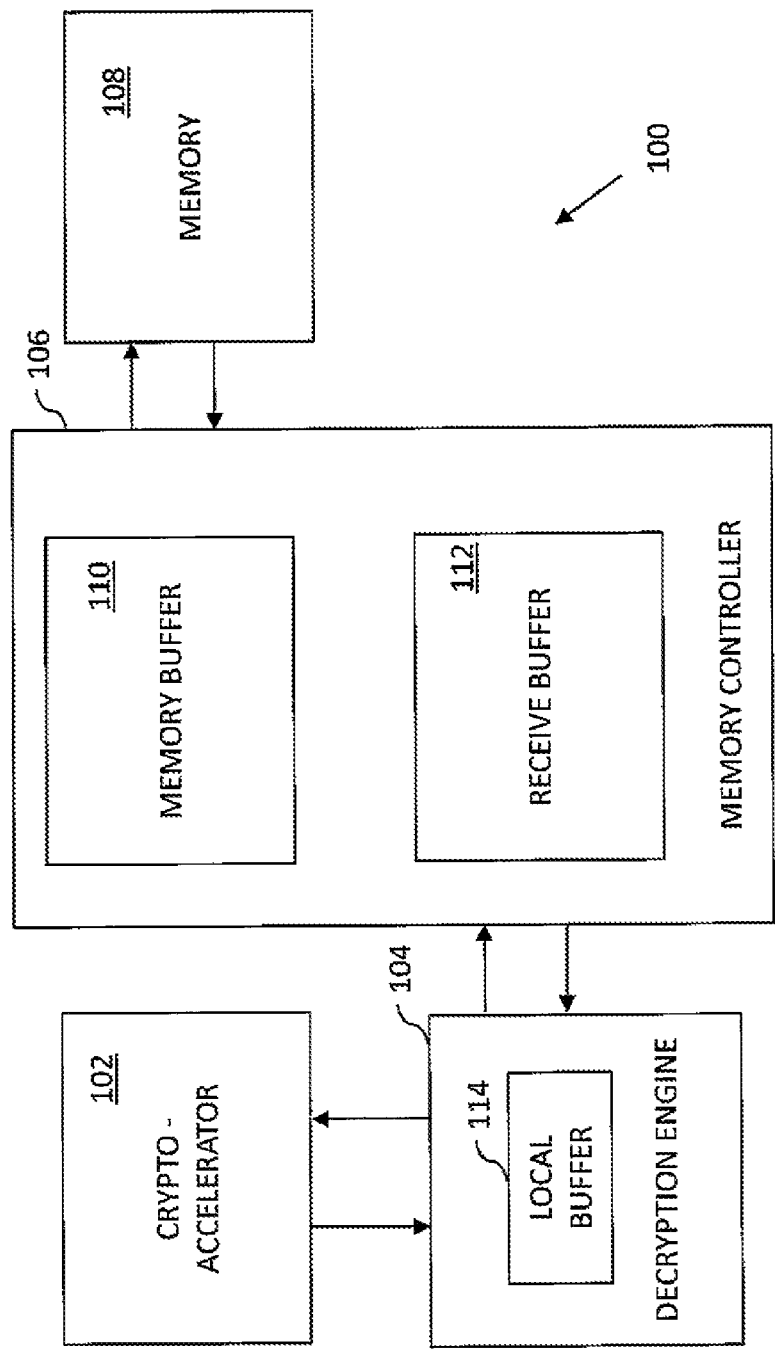
FIG. 1 is a schematic block diagram of a decryption key management system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a method for secure boot of an electronic device, where the electronic device includes a memory, a memory controller, a decryption engine, and a crypto-accelerator, and the memory controller includes a receive buffer. The method comprises storing an encrypted code and a key binary large object (BLOB) in the memory, wherein the key BLOB is used for generating a decryption key; fetching the key BLOB from the memory by the memory controller; transmitting the key BLOB from the memory controller to the decryption engine; generating a one time programmable (OTP) key by the crypto-accelerator; transmitting the OTP key to the decryption engine; decrypting the key BLOB using the OTP key, by the decryption engine, to generate the decryption key; storing the decryption key in a local buffer of the decryption engine; fetching a code segment of the encrypted code from the memory by the memory controller; decrypting the code segment using the decryption key to generate a decrypted code segment, by the decryption engine; and storing the decrypted code segment in the receive buffer.

In another embodiment, the present invention is a decryption key management system of an electronic device. The decryption key management system includes a memory for storing an encrypted code and a key binary large object (BLOB), where the key BLOB is used for generating a decryption key. A memory controller is connected to the memory for fetching the key BLOB and a code segment of the encrypted code from the memory. A decryption engine is connected to the memory controller for fetching the key BLOB and the code segment from the memory controller, decrypting the key BLOB using a one time programmable (OTP) key to generate the decryption key, decrypting the code segment using the decryption key to generate a decrypted code segment, and providing the decrypted code segment to the memory controller. The decrypted code segment is then used to boot the electronic device. A crypto-accelerator is connected to the decryption engine for generating and transmitting the OTP key to the decryption engine. In a preferred embodiment, the crypto-accelerator and the decryption engine are formed on the same chip (integrated circuit).

Various embodiments of the present invention provide a system and method for decryption key management. The decryption key management system includes a memory, a memory controller, a decryption engine, and an on-chip crypto-accelerator. A key binary large object (BLOB) and an encrypted code are stored in the memory. The memory controller fetches the key BLOB from the memory and stores it in a memory buffer. The memory controller fetches a predetermined count of bits equivalent to the bit length of the key BLOB and then stops fetching data. This eliminates any possibility of extraneous bits being input into the key management system and reinforces the security of the key management system. The configuration for fetching the key BLOB is a default hardware feature so that additional configuration is not necessary during boot. The key BLOB is provided to the decryption engine and stored in a local buffer of the decryption engine. To ensure that an application running on the system is not able to access the key BLOB, the decryption engine returns binary zeroes in response to any access request/fetch operation to a memory mapped region of the memory buffer where the key BLOB is stored, by a central processing unit (CPU) of the system.

The on-chip crypto-accelerator generates and transmits a one-time programmable (OTP) key to the decryption engine. The exchange of the OTP key with the decryption engine is transparent to the boot code and to any other application that runs on the system, which makes the decryption management system inaccessible by an external user. The decryption engine decrypts the key BLOB using the OTP key to generate a decryption key and stores the decryption key in a local buffer. Registers of the local buffer are not mapped to the memory to ensure inaccessibility from an external area. The registers are further masked from scan chains to ensure additional security, thus making the system more robust. The memory controller fetches a code segment of the encrypted code from the memory and stores it in its local memory buffer. The decryption engine in turn fetches the code segment from the memory buffer and decrypts it using the decryption key to generate a decrypted code segment. The decryption engine stores the decrypted code segment in a receive buffer of the memory controller.

Referring now to FIG. 1, a decryption key management system 100 in accordance with an embodiment of the present invention is shown. The decryption key management system 100 includes a crypto-accelerator 102, a decryption engine 104, a memory controller 106, and a memory 108. Preferably, the crypto-accelerator 102 and the decryption engine 104 are formed on the same integrated circuit or chip. The memory controller 106 includes a memory buffer 110 and a receive buffer 112, and the decryption engine 104 includes a local buffer 114.

The memory 108 stores an encrypted code and a key binary large object (BLOB). In an embodiment of the present invention, the memory 108 is a queued serial peripheral interface (QSPI) memory, the encrypted code is a boot code used to boot a computer system, and the key BLOB includes an encrypted version of a decryption key used to decrypt the encrypted code. The key BLOB has a bit length of 256 bits. Further, the memory 108 is connected to the memory controller 106 and the memory controller 106 is configured to fetch a predetermined count of bits equal to the bit length of the key BLOB (viz., 256 bits) from the memory 108. The memory controller 106 fetches the key BLOB and stores it in the memory buffer 110. The memory controller 106 is connected to the decryption engine 104. The decryption engine 104 fetches the key BLOB from the memory buffer 110 and stores it in the local buffer 114. In an embodiment of the present invention, the local buffer 114 is not memory mapped and thus cannot be accessed by an application running on the computer system. Additionally, the local buffer 114 is masked from scan chains to enhance its security. The decryption engine 104 also returns binary zeroes in response to a fetch operation corresponding to the memory mapped region of the memory buffer 110 where the key BLOB is stored.

The decryption engine 104 is connected to the on-chip crypto-accelerator 102. The on-chip crypto-accelerator 102 is configured to automatically generate a one-time programmable (OTP) key subsequent to the fetching of the key BLOB by the decryption engine 104. The on-chip crypto-accelerator 102 generates the OTP key using a hardware master key stored in the on-chip crypto-accelerator 102. In an embodiment of the present invention, the master key is hardwired in the on-chip crypto-accelerator 102. Further, the on-chip crypto-accelerator 102 is configured such that it does not need to be initialized for generating the OTP key. The on-chip crypto-accelerator 102 exchanges the OTP key with the decryption engine 104 through side band signals—'OTP valid' and 'OTP key'. The transmission of the OTP key to the decryption engine 104 is transparent to the boot code (obtained after decrypting the encrypted code) or any other application that may run on the computer system.

Upon receiving the OTP key, the decryption engine 104 decrypts the key BLOB using the OTP key to obtain the decryption key. In an embodiment of the present invention, the decryption engine 104 decrypts the key BLOB in accordance with advanced encryption standard—electronic codebook (AES-ECB) specification to obtain the decryption key. The decryption key is a local key. The decryption engine 104 stores the decryption key in the local buffer 114. Upon generation of the decryption key, the memory controller 106 receives an indication bit from the decryption engine 104 to fetch the encrypted code. The decryption engine 104 fetches a code segment of the encrypted code from the memory 108 and stores it in the memory buffer 110, and subsequently fetches the code segment from the memory buffer 110 and stores it in the local buffer 114. Subsequently, the decryption engine 104 decrypts the code segment of the encrypted code using the decryption key to generate a decrypted code segment. In an embodiment of the present invention, the decryption engine 104 decrypts the code segment in accordance with the AES-ECB specification to obtain the decrypted code segment.

The decryption engine 104 stores the decrypted code segment in the receive buffer 112. Thereafter, remaining code segments of the encrypted code are fetched from the memory 108 and the corresponding decrypted code segments are stored in the receive buffer 112 until the encrypted code is completely decrypted.

Figure 2A:
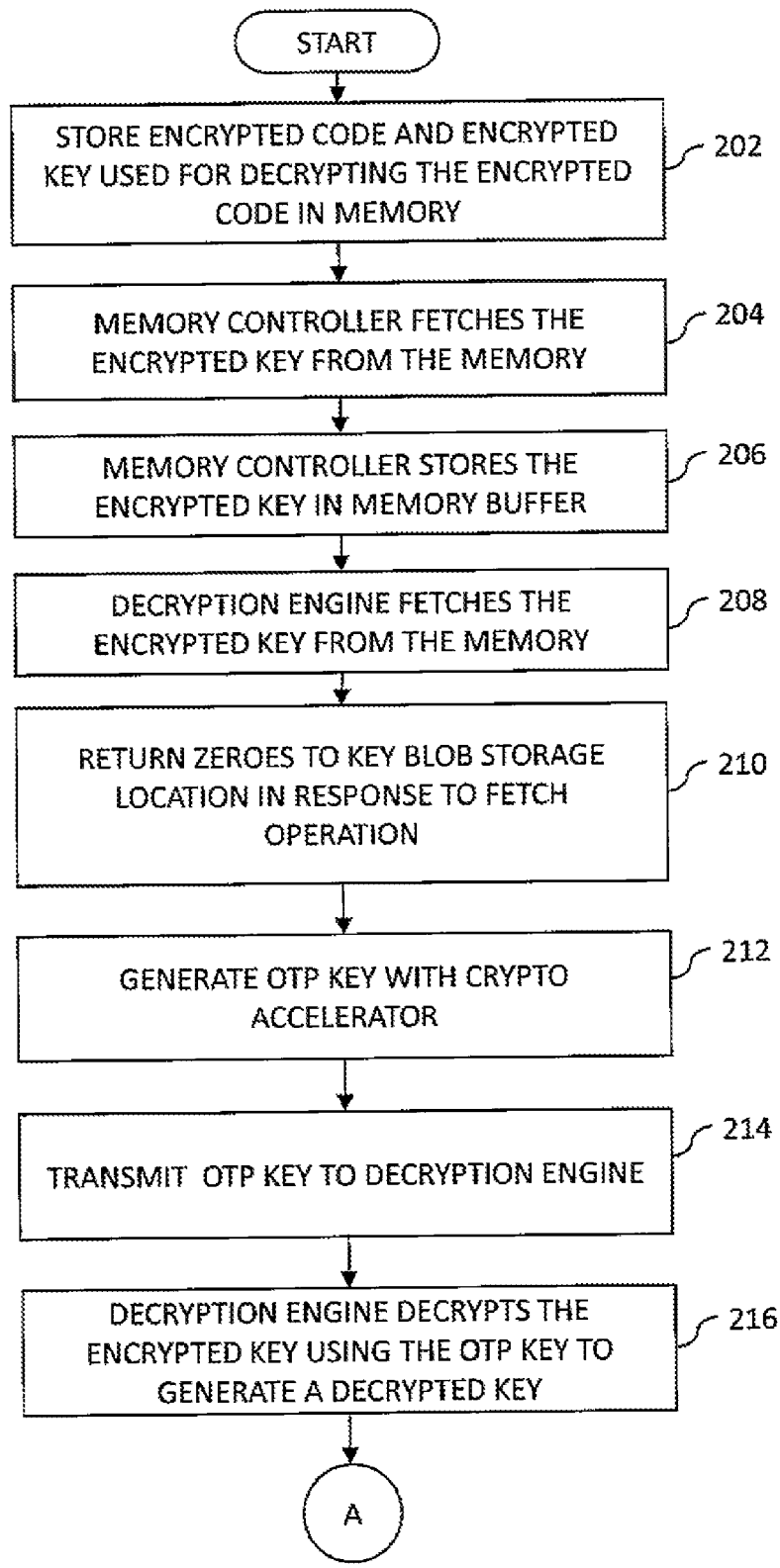
FIGS. 2A and 2B are a flowchart of a method for operating the decryption key management system of FIG. 1 in accordance with an embodiment of the present invention.
Figure 2B:
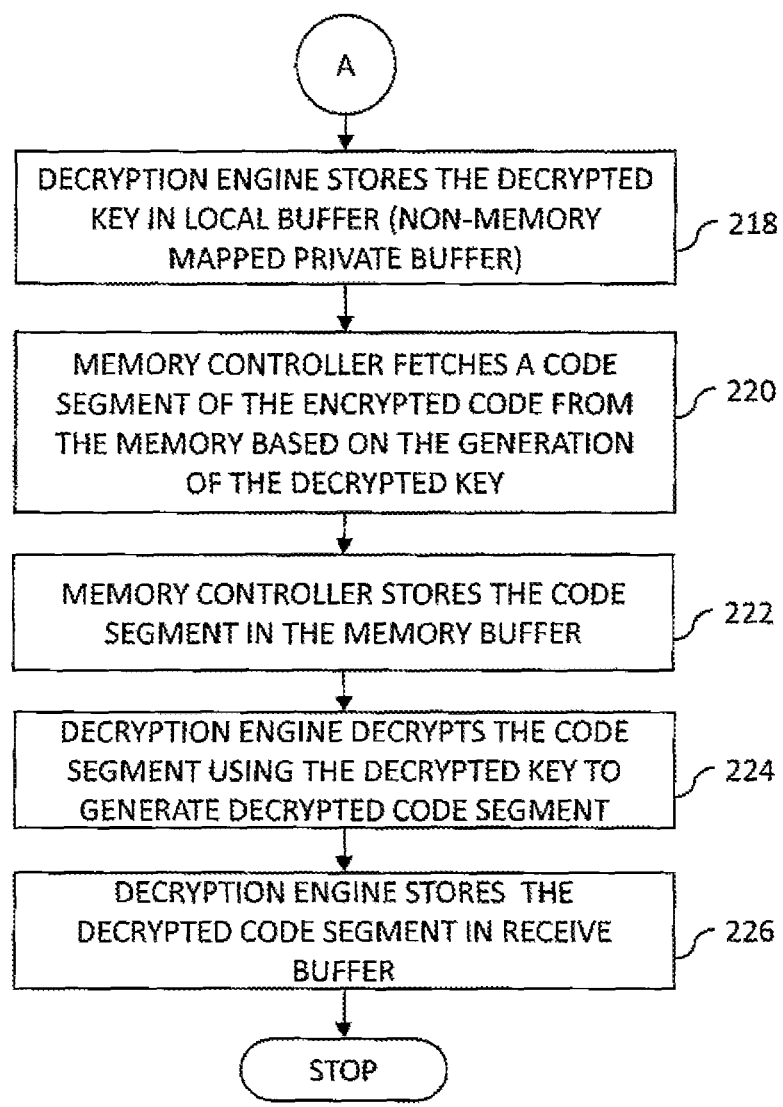

Referring now to FIG. 2, a flowchart of a method for operating the decryption key management system 100 in accordance with an embodiment of the present invention, is shown.

At step 202, the encrypted code and the encrypted key are stored in the memory 108. In an embodiment of the present invention, the encrypted code is a boot code used for booting-up a computer system and the encrypted key is a key BLOB. At step 204, the key BLOB is fetched from the memory 108 by the memory controller 106. At step 206, the key BLOB is stored in the memory buffer 110 by the memory controller 106. At step 208, the key BLOB is fetched from the memory controller 106 by the decryption engine 104 and is stored in the local buffer 114. At step 210, subsequent to fetching the key BLOB, binary zeroes are returned by the decryption engine 104 in response to any access request/fetch operation from a CPU corresponding to a memory mapped region of the memory buffer 110 that stores the key BLOB. Returning binary zeroes prevents any application running on the computer system from accessing the key BLOB. At step 212, the OTP key is generated by the on-chip crypto-accelerator 102. The on-chip crypto-accelerator 102 is configured such that it does not need to be initialized for generating the OTP key.

At step 214, the OTP key is transmitted to the decryption engine 104 by the on-chip crypto-accelerator 102 through side band signals—"OTP valid" and "OTP key". At step 216, the key BLOB is decrypted by the decryption engine 104 using the OTP key to generate the decryption key. At step 218, the decryption key is stored in the local buffer 114 by the decryption engine 104. At step 220, subsequent to the generation of the OTP key, an indication signal is transmitted to the memory controller 106, which in turn fetches the code segment of the encrypted code from the memory 108. At step 222, the code segment of the encrypted code is stored in the memory buffer 110 by the memory controller 106. At step 224, the code segment of the encrypted code is decrypted by the decryption engine 104 using the decryption key stored in the local buffer 114 to generate the decrypted code segment. In an embodiment of the present invention, the decryption engine 104 decrypts the code segment of the encrypted code in accordance with the AES-ECB specification to obtain the decrypted code segment. At step 226, the decrypted code segment is stored in the receive buffer 112 by the decryption engine 104.

While various embodiments of the present invention have been illustrated and described, it will be clear that the present invention is not limited to these embodiments only. For example, although the invention is described as used for booting a computer system, the invention can be used to boot other types of electronic devices that include processors and boot codes, such as smart phones. Numerous modifications, changes, variations, substitutions, and equivalents will be apparent to those skilled in the art, without departing from the spirit and scope of the present invention, as described in the claims.

The invention claimed is:

1. A decryption key management system, comprising:
a memory for storing an encrypted code and a key binary large object (BLOB), wherein the key BLOB is used for generating a decryption key;
a memory controller including a memory buffer and a receive buffer, wherein the memory controller is connected to the memory for fetching the key BLOB and a code segment of the encrypted code from the memory and storing the fetched key BLOB and the fetched code segment in the memory buffer;
a decryption engine connected to the memory controller for (i) fetching the key BLOB and the code segment from the memory buffer and storing them in a local buffer of the decryption engine, (ii) decrypting the key BLOB using a one time programmable (OTP) key to generate the decryption key, (iii) decrypting the code segment using the decryption key to generate a decrypted code segment, and (iv) providing the decrypted code segment to the memory controller for storage in the receive buffer; and
a crypto-accelerator connected to the decryption engine for generating and transmitting the OTP key to the decryption engine, wherein the crypto-accelerator and the decryption engine are formed on the same chip and communicate with each other using side band signals, and
wherein the crypto-accelerator generates the OTP key automatically when the system is powered on,
the local buffer of the decryption engine is not memory mapped so is not accessible by the memory controller, and
the local buffer of the decryption engine is not connected to a scan chain so is not accessible by a debugger.

2. The decryption key management system of claim 1, wherein the side band signals comprise an OTP key signal for passing the OTP key to the local buffer of the decryption engine and an OTP valid signal for indicating a validity of the OTP key, wherein the OTP key and the OTP valid signals are transparent to any application software running on the system.

3. The decryption key management system of claim 1, wherein the decryption engine returns a plurality of binary zeroes to the memory controller in response to a fetch operation corresponding to a storage location of the key BLOB.

4. The decryption key management system of claim 1, wherein the encrypted code and key BLOB are encrypted based on advanced encryption standard-electronic codebook specification.

5. The decryption key management system of claim 1, wherein the decryption engine decrypts the encrypted code and the key BLOB based on the advanced encryption standard-electronic codebook specification.

6. The decryption key management system of claim 1, wherein the memory is a queued serial peripheral interface (QSPI) memory.

7. The decryption key management system of claim 1, wherein the encrypted code is a boot code used for booting an electronic device.

8. The decryption key management system of claim 1, wherein the decryption key is a symmetric key.

9. A decryption key management system, comprising:
a queued serial peripheral interface (QSPI) memory for storing an encrypted boot code and a key binary large object (BLOB);
a memory controller connected to the memory for fetching the key BLOB and a code segment of the encrypted boot code from the memory, wherein the memory controller includes a memory buffer for storing the key BLOB and the code segment, and a receive buffer for storing decrypted code;
a decryption engine connected to the memory controller for fetching the key BLOB and the code segment from the memory buffer, decrypting the key BLOB using a one time programmable (OTP) key to generate a decryption key, decrypting the code segment using the decryption key to generate a decrypted code segment, and providing the decrypted code segment to the receive buffer of the memory controller, wherein the decryption engine includes a local buffer for storing the fetched key BLOB and code segment and the decryption key; and
a crypto-accelerator connected to the decryption engine for generating the OTP key using a hardware master key and transmitting the OTP key to the decryption engine, wherein the decryption engine, the memory controller and the crypto-accelerator are all formed on the same chip, and the crypto-accelerator generates the OTP key automatically when the system is powered up;
wherein the decryption engine returns a plurality of binary zeroes in response to a fetch operation corresponding to a storage location of the key BLOB; and
wherein the local buffer of the decryption engine is not memory mapped and is masked from scan chains such that the local buffer is not accessible by a debugger.

10. A method of securely booting an electronic device, wherein the electronic device includes a memory, a memory controller, a decryption engine, and a crypto-accelerator, and the memory controller includes a memory buffer and a receive buffer, the method comprising:
storing an encrypted boot code and a key binary large object (BLOB) in the memory, wherein the key BLOB is used for generating a decryption key;
fetching the key BLOB from the memory by the memory controller and storing the key BLOB in the memory buffer;
transmitting the key BLOB from the memory controller to the decryption engine and storing the key BLOB in a local buffer of the decryption engine, wherein the local buffer is not memory mapped and is not connected to a scan chain;

generating a one time programmable (OTP) key by the crypto-accelerator, wherein the crypto-accelerator automatically generates the OTP key when the electronic device is powered on;

transmitting the OTP key to the decryption engine using a side band signal;

decrypting the key BLOB using the OTP key, by the decryption engine, to generate the decryption key;

storing the decryption key in the local buffer of the decryption engine, wherein the decryption key is not accessible by the memory controller;

fetching a code segment of the encrypted boot code from the memory by the memory controller and providing the fetched code segment to the decryption engine;

decrypting the code segment using the decryption key to generate a decrypted code segment, by the decryption engine; and storing the decrypted code segment in the receive buffer, and wherein the memory controller returns a string of binary zeroes in response to a fetch operation that indicates an address of the key BLOB.

11. The method of claim 10, wherein the boot code and the key BLOB are stored in predetermined locations of the memory.

12. The method of claim 11, wherein the memory controller automatically stops reading the memory after reading a predetermined number of memory addresses.

13. The method of claim 10, wherein the memory is a queued serial peripheral interface (QSPI) memory.

14. The method of claim 10, further comprising booting the electronic device using the decrypted code segment.

15. The method of claim 10, wherein the decryption key is a symmetric key.

* * * * *